United States Patent
Yamauchi et al.

(10) Patent No.: US 10,902,246 B2
(45) Date of Patent: Jan. 26, 2021

(54) DEVICE AND METHOD FOR DETERMINING JOB TYPES BASED ON WORKER MOVEMENTS

(71) Applicant: Kabushiki Kaisha Toshiba, Tokyo (JP)

(72) Inventors: Yasunobu Yamauchi, Kanagawa (JP); Kazunori Imoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 16/102,795

(22) Filed: Aug. 14, 2018

(65) Prior Publication Data
US 2019/0251338 A1  Aug. 15, 2019

(30) Foreign Application Priority Data
Feb. 13, 2018  (JP) ................................. 2018-023266

(51) Int. Cl.
*G06K 9/00* (2006.01)
*G06K 9/62* (2006.01)

(52) U.S. Cl.
CPC ..... *G06K 9/00335* (2013.01); *G06K 9/00771* (2013.01); *G06K 9/6262* (2013.01)

(58) Field of Classification Search
None
See application file for complete search history.

(56) References Cited

U.S. PATENT DOCUMENTS

| | | | | |
|---|---|---|---|---|
| 6,571,193 | B1* | 5/2003 | Unuma | A43B 3/0005 340/853.2 |
| 7,769,203 | B2* | 8/2010 | Oohashi | G05D 1/0251 382/103 |
| 8,060,394 | B2* | 11/2011 | Woodings | G06Q 10/06311 705/7.13 |
| 8,554,605 | B2* | 10/2013 | Oleson | G06Q 10/06311 705/7.41 |
| 2003/0200308 | A1* | 10/2003 | Tameda | H04L 63/20 709/224 |
| 2006/0259472 | A1* | 11/2006 | MacClellan | G06Q 10/06 |
| 2011/0022432 | A1* | 1/2011 | Ishida | G06Q 10/06 705/7.42 |

(Continued)

FOREIGN PATENT DOCUMENTS

| | | |
|---|---|---|
| JP | 2009-122302 A | 6/2009 |
| JP | 2010-161991 A | 7/2010 |
| JP | 2017-10186 A | 1/2017 |

*Primary Examiner* — Andrae S Allison
(74) *Attorney, Agent, or Firm* — Finnegan, Henderson, Farabow, Garrett & Dunner, L.L.P.

(57) ABSTRACT

A determination device according to an embodiment includes one or more processors. The processors identify a worker position. The processors identify a job area which includes the worker position. The processors select, from among a plurality of determiners meant for determining job details of persons from movement information indicating movements of persons, at least one determiner associated with the job area. The processors generate worker movement information indicating movements of a worker. The processors use the at least one selected determiner and determine a job type indicating job details of the worker based on the worker movement information.

20 Claims, 13 Drawing Sheets

(56) References Cited

U.S. PATENT DOCUMENTS

| | | | |
|---|---|---|---|
| 2012/0237086 A1* | 9/2012 | Kourogi | G01C 21/20 382/103 |
| 2014/0244209 A1* | 8/2014 | Lee | G06K 9/00536 702/150 |
| 2015/0015718 A1* | 1/2015 | Fujimatsu | G06K 9/00771 348/159 |
| 2015/0326709 A1* | 11/2015 | Pennanen | A61B 5/1118 455/456.6 |

* cited by examiner

DEVICE AND METHOD FOR DETERMINING JOB TYPES BASED ON WORKER MOVEMENTS

CROSS-REFERENCE TO RELATED APPLICATIONS

This application is based upon and claims the benefit of priority from Japanese Patent Application No. 2018-023266, filed on Feb. 13, 2018; the entire contents of which are incorporated herein by reference.

FIELD

Embodiments described herein relate generally to a determination device, a determination method, a computer program product.

BACKGROUND

A recognition system is known that recognizes the movements of a worker in a factory. In that recognition system, movement information of a worker is obtained from a sensor worn by the worker, and a determiner (for example, dictionary data) is used to recognize the movements of the worker from the obtained movement information. Using such a recognition system, the administrator becomes able to confirm whether the worker is performing the jobs in a correct way.

In the factory, the worker performs various jobs. Hence, it is difficult for the recognition system to determine all movements using a single common determiner. On the other hand, if a recognition system performs the recognition operation by concurrently using multiple determiners, then the efficiency becomes poorer and the cost becomes higher.

Moreover, in a factory, productivity improvement is carried out as appropriate. Hence, the recognition system constantly needs to collect movement information of the workers, to generate teacher data and perform learning operations, and to properly update the determiners. However, constantly updating a plurality of determiners leads to an extremely poor efficiency and a high cost.

It is an object of the present invention to efficiently determine the job type indicating the job details of a worker.

DETAILED DESCRIPTION

A determination device according to an embodiment includes one or more processors. The processors identify a worker position. The processors identify a job area which includes the worker position. The processors select, from among a plurality of determiners meant for determining job details of persons from movement information indicating movements of persons, at least one determiner associated with the job area. The processors generate worker movement information indicating movements of a worker. The processors use the at least one selected determiner and determine a job type indicating job details of the worker based on the worker movement information.

Exemplary embodiments of the present invention are described below with reference to the accompanying drawings.

First Embodiment

Figure 1:
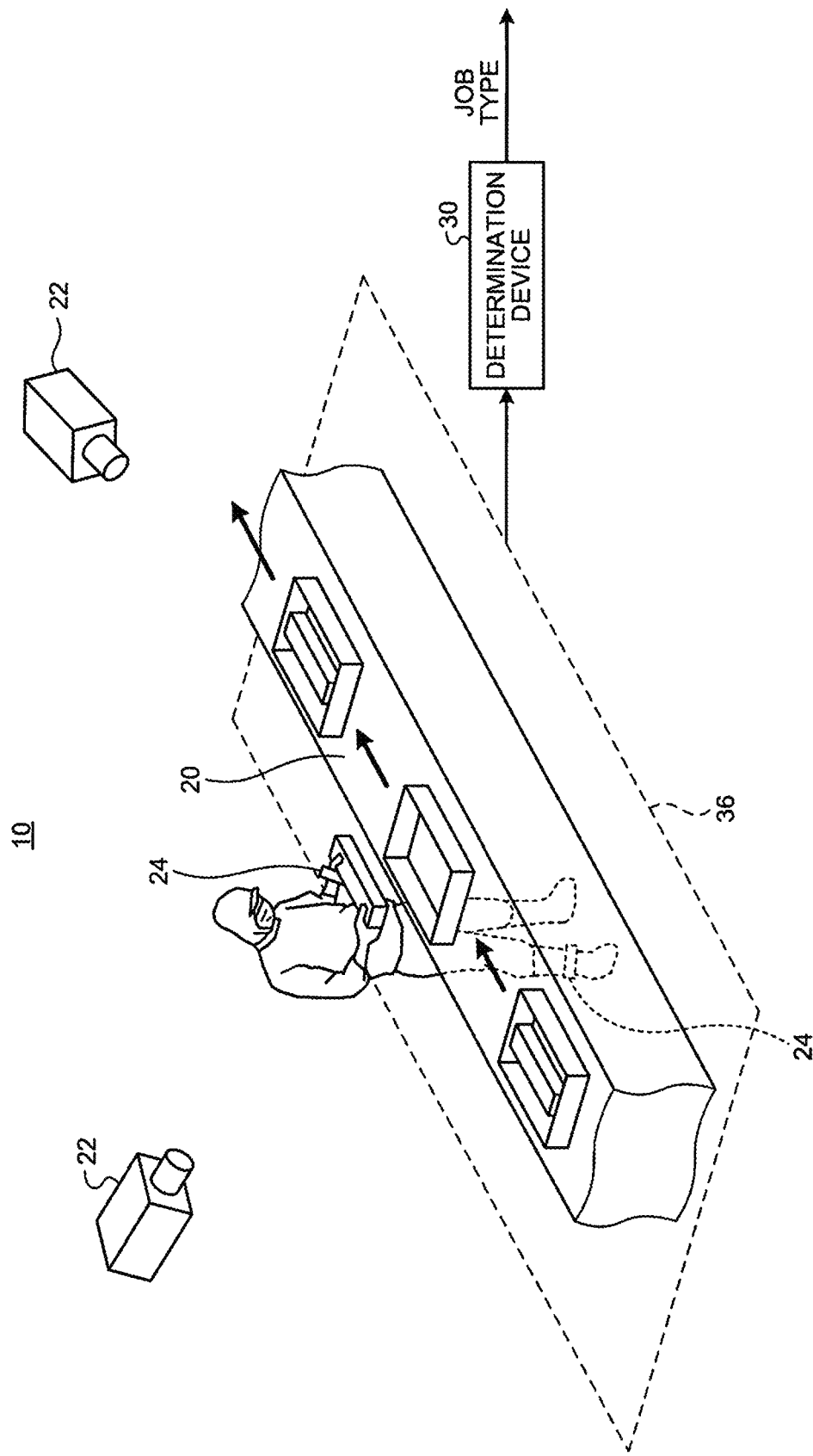
FIG. 1 is a diagram illustrating a recognition system.

FIG. 1 is a diagram illustrating a recognition system 10 according to a first embodiment.

The recognition system 10 determines the job details of the workers in, for example, a manufacturing line 20 of a factory. The recognition system 10 includes at least a single position sensor 22, at least a single movement sensor 24, and a determination device 30.

Each position sensor 22 detects position information indicating positions of a worker. For example, the position sensor 22 detects the worker positions within a target range 36, which is used in determining the job details of the worker in the recognition system 10. In the case of determining the job details of a worker in a factory, for example, the target range 36 represents a room in the factory building or represents the factory premises.

The position sensor 22 can be any type of device as long as it is capable of detecting the worker positions. For example, the position sensor 22 can be a camera that detects the position information of the worker from taken images in which the worker is captured.

Alternatively, for example, the position sensor 22 can be a wireless receiving terminal (for example, a Bluetooth (registered trademark) terminal) that is worn by the worker. In that case, the wireless receiving terminal receives a plurality of beacons transmitted from each of a plurality of wireless sending terminals installed at a plurality of positions. The wireless receiving terminal estimates the distance to each wireless sending terminal according to the reception strength of each beacon. Then, based on the estimated distances and the positions of the wireless sending terminals, the wireless receiving terminal calculates the worker positions.

When the worker is out of doors, the receiving terminal can receive a plurality of signals transmitted from a plurality of global positioning system (GPS) satellites, and can calculate the positions of the worker from the received signals. Meanwhile, for example, the position sensor 22 can be a device for calculating the movement distance of the worker according to an acceleration sensor worn by the worker.

Each movement sensor 24 detects movement information indicating the movements of a worker. Herein, the movement sensor 24 can detect the overall movement of the body of the worker. Alternatively, the movement sensor 24 can detect individual movements of various body parts, such as arms, hands, fingers, legs, head, joints, and eyes, of the worker. Still alternatively, the movement sensor 24 can be an acceleration sensor or a gyro sensor attached to the waist of the worker, and can detect whether the worker is still or walking. Still alternatively, the movement sensor 24 can be an acceleration sensor or a gyro sensor attached to an arm, a leg, or the head of the worker, and can detect the individual movements of the arm, the leg, or the head. Still alternatively, the movement sensor 24 can be a camera for capturing the worker and an information processing device for analyzing the movements of the worker based on the taken images.

The determination device 30 has the hardware configuration identical to, for example, a general-purpose computer, and executes predetermined application programs. The determination device 30 receives position information from each position sensor 22. Moreover, the determination device 30 receives movement information from each movement sensor 24. The determination device 30 receives the position information and the movement information at regular intervals (of five seconds, for example). Then, based on the position information and the movement information, the determination device 30 determines the job type indicating the job details of the worker.

Meanwhile, when there is a plurality of workers, the determination device 30 receives the position and the movement information for each worker. Then, the determination device 30 determines the job type indicating the job details of each worker.

Figure 2:
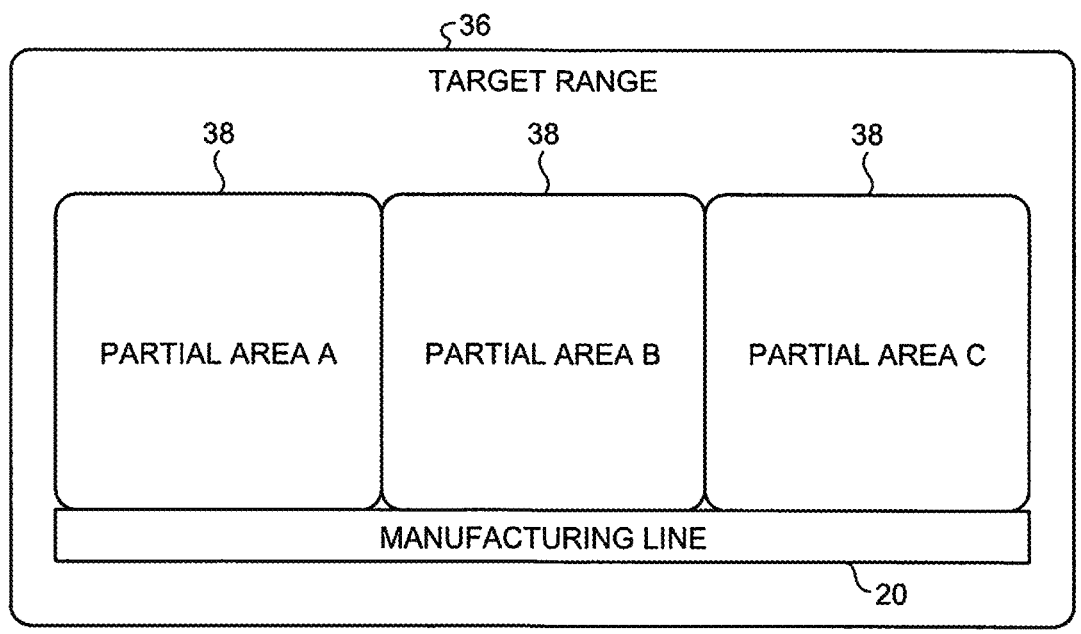
FIG. 2 is a diagram illustrating a first example of a plurality of partial areas.
Figure 3:
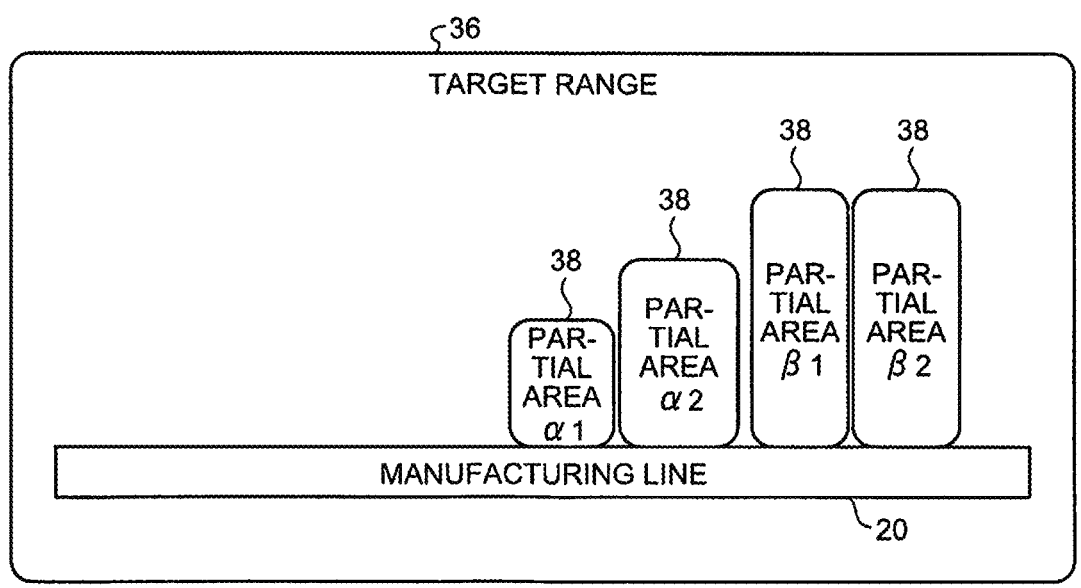
FIG. 3 is a diagram illustrating a second example of a plurality of partial areas.

FIG. 2 is a diagram illustrating a first example of a plurality of partial areas 38 set in the target range 36. FIG. 3 is a diagram illustrating a second example of a plurality of partial areas 38 set in the target range 36.

In the determination device 30, information indicating the partial areas 38 is registered. Each partial area 38 is such a partial area in the target range 36 in which the worker is predicted to perform the same job. Herein, the partial areas 38 are decided by the administrator, for example.

In a factory, the manufacturing line 20 including manufacturing devices and a carrier device is set up in the target range 36. Moreover, in a factory, according to the positions of the manufacturing devices and the position of the carrier device in the manufacturing line 20, the details of the jobs to be performed by the worker are fixed. Thus, based on the positions of the manufacturing devices and the position of the carrier device in the manufacturing line 20, the administrator can set, in advance, the partial areas 38 in which the same jobs are predicted to be performed.

Meanwhile, the partial areas 38 are adjusted also depending on the desired job types to be determined by the recognition system 10. For example, when the worker has to move around a lot and when the general movements of the worker are to be determined, the partial areas 38 are set to be relatively large areas as illustrated in FIG. 2. On the other hand, when there are many jobs at hand and, for example, when the movements of the worker at each manufacturing device are to be determined, the partial areas 38 are set in a relatively small range near the manufacturing devices as illustrated in FIG. 3.

Figure 4:
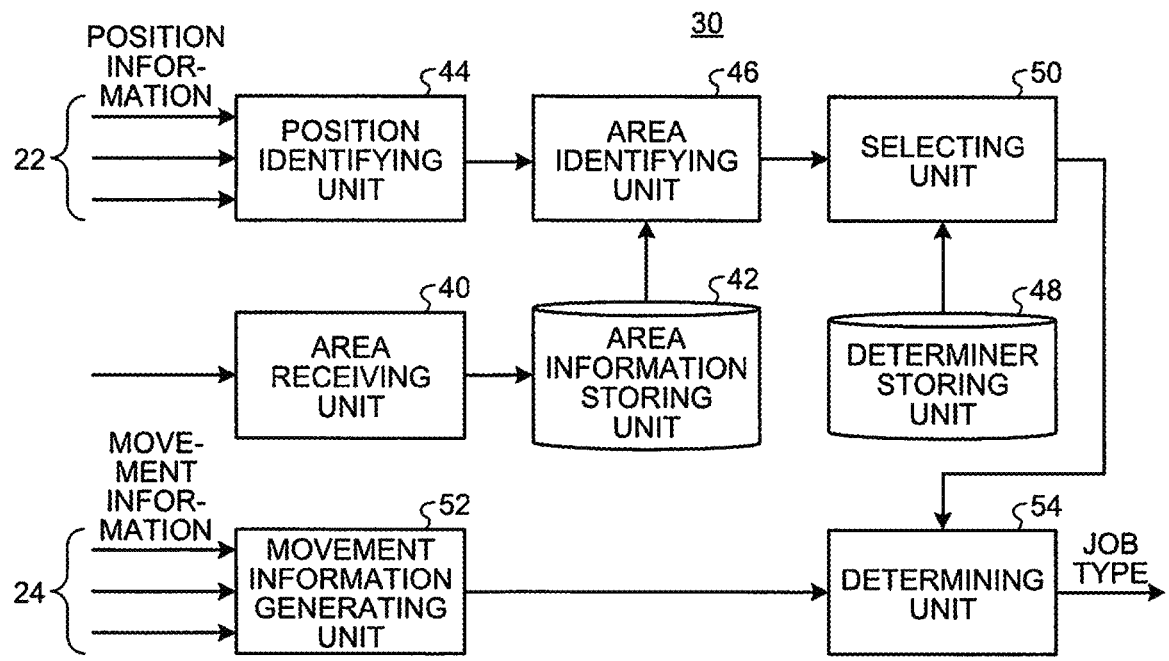
FIG. 4 is a diagram illustrating a configuration of a determination device according to a first embodiment.

FIG. 4 is a diagram illustrating a configuration of the determination device 30 according to the first embodiment. The determination device 30 includes an area receiving unit 40, an area information storing unit 42, a position identifying unit 44, an area identifying unit 46, a determiner storing unit 48, a selecting unit 50, a movement information generating unit 52, and a determining unit 54.

In response to an instruction from the administrator, the area receiving unit 40 receives information indicating a plurality of partial areas 38. For example, the area receiving unit 40 displays an image indicating the target range 36 in a display device, and receives specification of a plurality of partial areas 38 from the administrator. The area information storing unit 42 stores the information indicating a plurality of partial areas 38 as received by the area receiving unit 40.

The position identifying unit 44 receives the position information from each position sensor 22. Then, based on the received position information, the position identifying unit 44 identifies the worker positions in the target range 36. Subsequently, the position identifying unit 44 sends the identified worker positions to the area identifying unit 46.

The area identifying unit 46 refers to the information stored in the area information storing unit 42 and identifies, as the job area, one partial area 38 that, from among a plurality of partial areas 38, includes the worker positions identified by the position identifying unit 44. Then, the area identifying unit 46 sends the information indicating the identified job area to the selecting unit 50.

The determiner storing unit 48 stores a plurality of determiners. Each determiner represents information to be used in determining the job details of a person from movement information that represents the movements of the person and that has a predetermined format. The determiners enable determination of, for example, mutually different job types.

For example, a determiner represents a pattern recognition model such as a support vector machine. In that case, the determiner is trained in advance to be able to obtain a predetermined determination result with respect to movement information representing teacher data. If a determiner represents information and a model to be used in determining the job type from the movement information, then the determiner is not limited to be a support vector machine and can alternatively be a random forest, a multilayer perceptron, or a neural network.

Meanwhile, each of a plurality of partial areas 38 is associated with at least a single determiner. Thus, with respect to a single partial area 38, either a single determiner can be associated, or a plurality of determiners can be associated.

For example, in the first embodiment, as given below in Table 1, each partial area 38 is associated with at least one job type. Moreover, each job type has a single determiner associated therewith.

TABLE 1

| Partial area | Type | Determiner |
| --- | --- | --- |
| A | Component replenishment | First determiner (for component replenishment) |
| B | Device operations | Second determiner (for device operations) |
|  | Notes | Third determiner (for Notes) |
| C | Carriage movement | Fourth determiner (for carriage movement) |
|  | PC input | Fifth determiner (for PC input) |

For example, in Table 1, a partial area 38-A has a job type called "component replenishment" associated thereto; a partial area 38-B has job types called "device operations" and "notes" associated thereto; and a partial area 38-C has job types called "carriage movement" and "PC input" associated thereto. Moreover, in Table 1, the jot type "component replenishment" has a first determiner associated thereto; the job type "device operations" has a second determiner associated thereto; the job type "notes" has a third determiner associated thereto; the job type "carriage movement" has a fourth determiner associated thereto; and the job type "PC input" has a fifth determiner associated thereto.

Meanwhile, the determiner storing unit 48 need not be installed in the determination device 30, and can be installed in some other server. In that case, the determination device 30 accesses the server via a network, and obtains a plurality of determiners.

The selecting unit 50 selects at least a single determiner associated with the identified job area from among a plurality of determiners stored in the determiner storing unit 48. For example, in the example given in Table 1, when the partial area 38-A is identified as the job area, the selecting unit 50 selects the first determiner. When the partial area 38-B is identified as the job area, the selecting unit 50 selects the second and third determiners. When the partial area 38-C is identified as the job area, the selecting unit 50 selects the fourth and fifth determiners. Then, the selecting unit 50 sends information indicating the selected determiners to the determining unit 54.

The movement information generating unit 52 receives, from each movement sensor 24, movement information indicating the movements of the worker. Then, based on the received movement information, the movement information generating unit 52 generates worker movement information indicating the movements of the worker. For example, the movement information generating unit 52 combines a plurality of sets of movement information obtained from a plurality of movement sensors 24, and generates worker movement information having a predetermined format. Then, the movement information generating unit 52 sends the generated worker movement information to the determining unit 54.

The determining unit 54 uses at least a single determiner selected by the selecting unit 50 and, based on the worker movement information generated by the movement information generating unit 52, determines the job type indicating the job details of the worker.

For example, the determining unit 54 determines whether the worker is doing the component replenishment job, or the device operation job, or the job of taking notes, or the carriage moving job, or the PC input job. Moreover, the determining unit 54 can generate the degree of reliability of each job type. In that case, the determining unit 54 outputs sets including candidate types, which represent the candidates for job type, and the degrees of reliability. Meanwhile, when the job type is determined using a plurality of determiners, the determining unit 54 outputs the candidate types having the highest degree of reliability as the job types.

Herein, the determination device 30 can determine the job type at regular intervals (of one minute, for example). Moreover, the determination device 30 can receive the position information and the movement information regarding a plurality of workers. In that case, the determination device 30 determines the job type for each worker.

Figure 5:
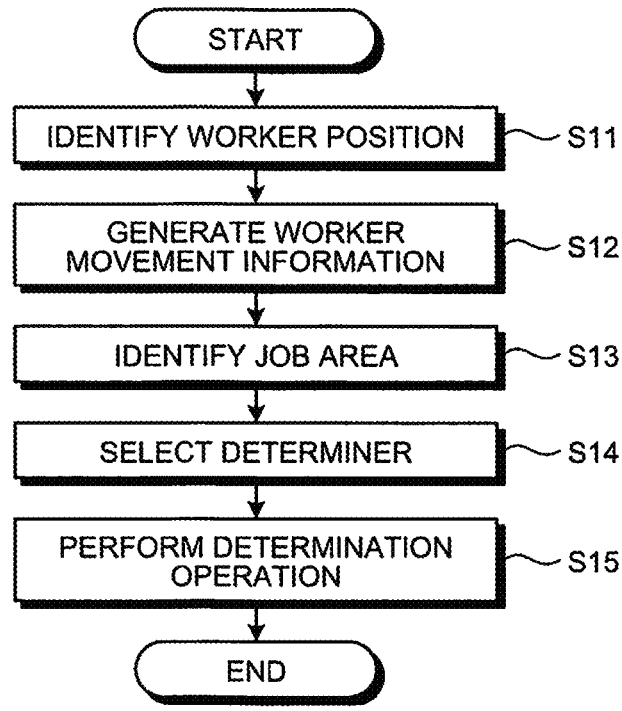
FIG. 5 is a flowchart for explaining a flow of operations performed by the determination device according to the first embodiment.

FIG. 5 is a flowchart for explaining a flow of operations performed by the determination device 30 according to the first embodiment. The determination device 30 according to the first embodiment performs operations according to the flow illustrated in FIG. 5.

Firstly, at step S11, the determination device 30 receives position information from the position sensor 22, and identifies the worker positions based on the received position information. Then, at step S12, the determination device 30 receives, from the movement sensor 24, movement information indicating the movements of the worker; and generates worker movement information based on the received movement information.

Subsequently, at step S13, the determination device 30 identifies, as the job area, a single partial area 38 that, from among a plurality of partial areas 38, includes the identified worker positions. Then, at step S14, the determination device 30 selects at least a single determiner associated with the identified job area from among a plurality of determiners stored in the determiner storing unit 48. Subsequently, at step S15, the determination device 30 uses the selected determiner and, based on the generated worker movement information, determines the job type indicting the job details of the worker.

In this way, the determination device 30 according to the first embodiment selects the appropriate determiners according to the worker positions, and determines the job type indicating the job details of the worker using the selected proper determiners. As a result, the determination device 30 can determine the job type in an efficient and accurate manner.

Second Embodiment

Given below is the explanation of the determination device 30 according to a second embodiment. The determination device 30 according to the second embodiment is implemented in the recognition system 10 identical to the recognition system 10 according to the first embodiment. The same is the case in a third embodiment and beyond. Moreover, the determination device 30 according to the second embodiment has a substantially identical configuration and functions as the first embodiment. Hence, the same constituent elements are referred to by the same reference numerals, and the detailed explanation is given only about the differences from the first embodiment.

Figure 6:
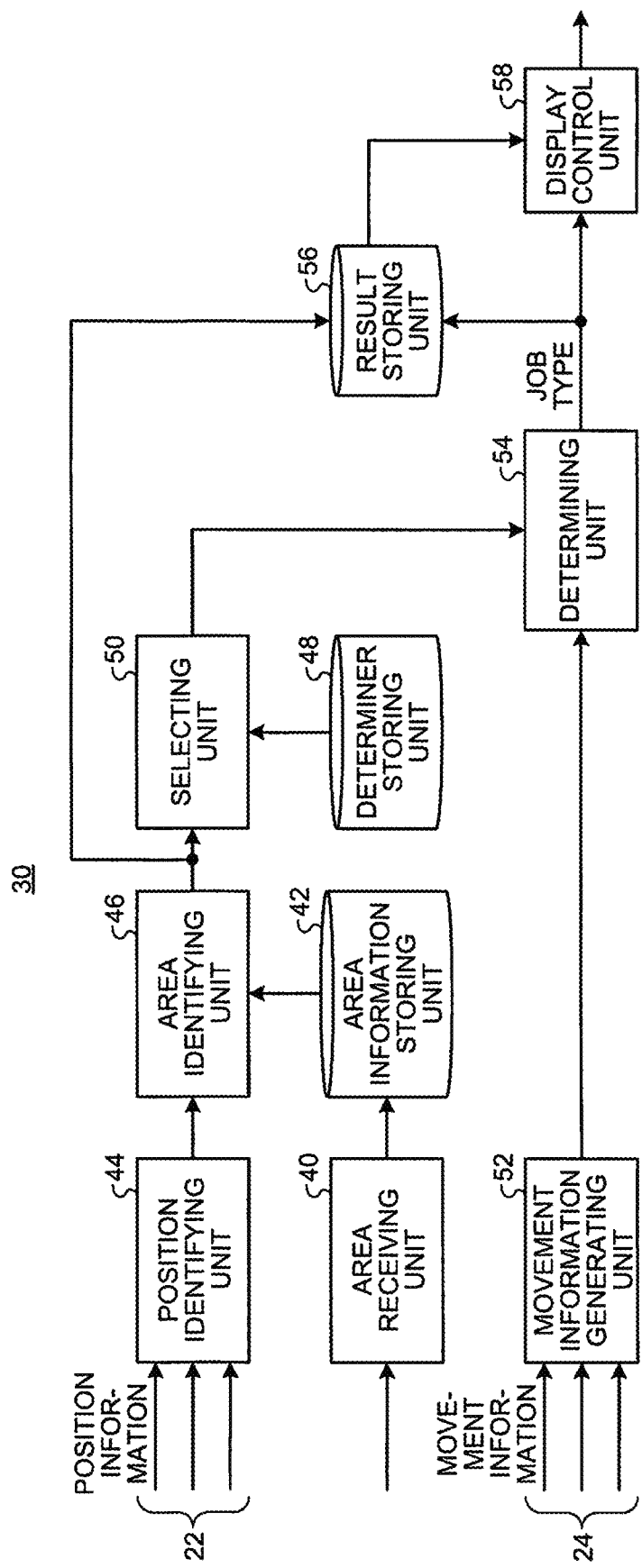
FIG. 6 is a diagram illustrating a configuration of the determination device according to a second embodiment.

FIG. 6 is a diagram illustrating a configuration of the determination device 30 according to the second embodiment. The determination device 30 according to the second embodiment further includes a result storing unit 56 and a display control unit 58.

The result storing unit 56 stores the job area and the job type, which are identified at regular intervals (of one minute, for example), in a corresponding manner to the movement timing. The display control unit 58 displays the job type, which is determined by the determining unit 54, in the display device. The display control unit 58 displays the current job type in the display device. Moreover, the display control unit 58 can read, from the result storing unit 56, the job type at a past timing specified by the administrator, and can display the read job type in the display device.

Figure 7:
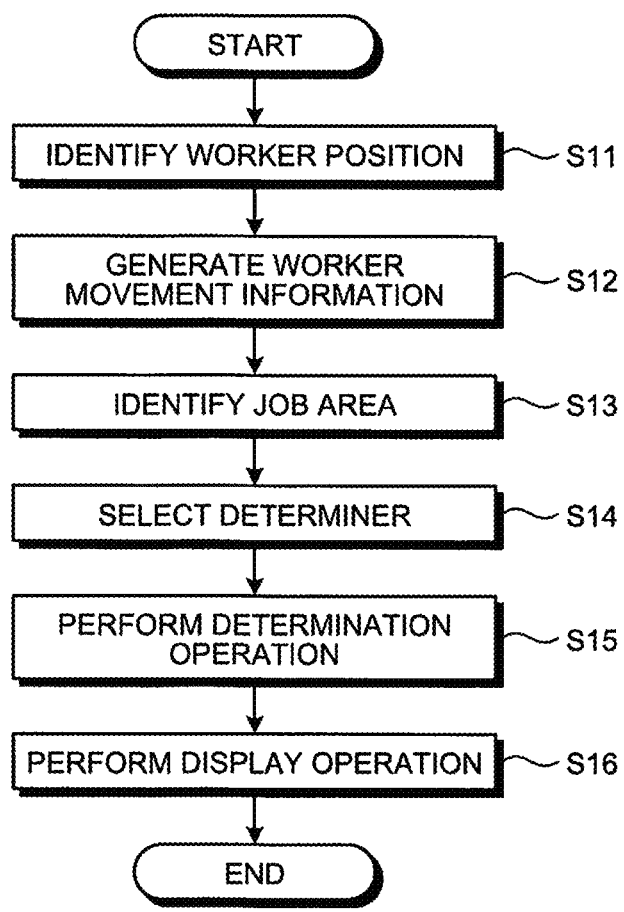
FIG. 7 is a flowchart for explaining a flow of operations performed by the determination device according to the second embodiment.

FIG. 7 is a flowchart for explaining a flow of operations performed by the determination device 30 according to the second embodiment. The determination device 30 according to the second embodiment performs operations according to the flow illustrated in FIG. 7.

The determination device 30 according to the second embodiment performs the operations from S11 to step S15 in an identical manner to the operations illustrated in the flowchart in FIG. 5. After the operation at step S15, the determination device 30 displays, at step S16, the determined job type in the display device.

Figure 8:
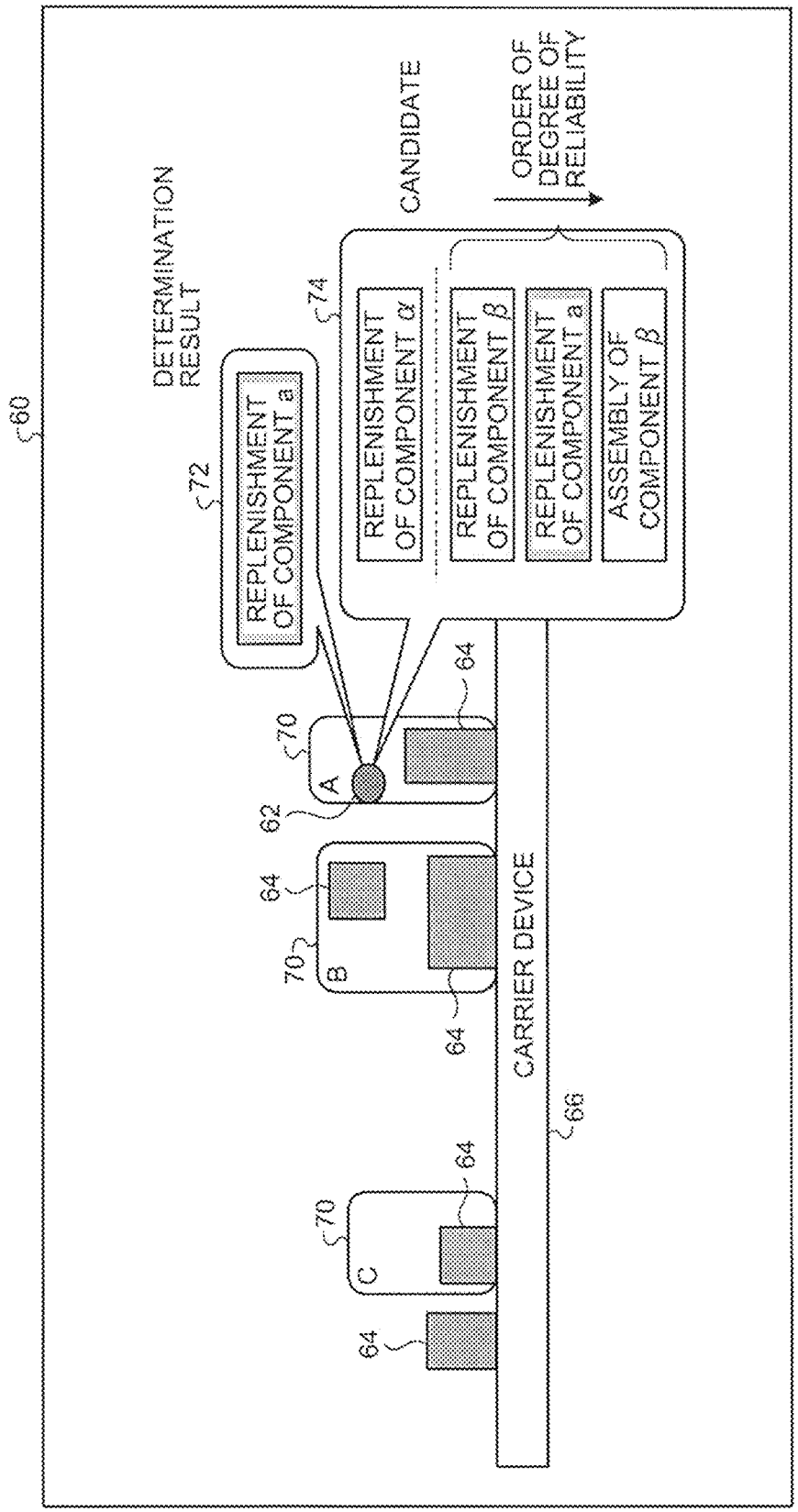
FIG. 8 is a diagram illustrating a first exemplary image displayed by the determination device according to the second embodiment.

FIG. 8 is a diagram illustrating a first exemplary image displayed by the determination device 30 according to the second embodiment. The display control unit 58 displays a target range image 60 indicating the target range 36 in the display device. For example, the target range image 60 includes manufacturing device images 64 at the positions of installation of the manufacturing devices. Moreover, for example, the target range image 60 includes a carrier device image 66 at the position of installation of the carrier device.

The display control unit 58 displays a worker mark 62, which indicates the worker position, at the corresponding position in the target range image 60. As a result, the display control unit 58 enables the administrator to easily confirm the worker position.

Moreover, the display control unit 58 displays partial area images 70, which indicate the range of the partial areas 38, at the corresponding positions in the target range image 60. As a result, the display control unit 58 enables the administrator to easily confirm the range of the partial areas 38.

Furthermore, the display control unit 58 displays a determination result image 72 indicating the determined job type. For example, the display control unit 58 displays the determination result image 72 at the position corresponding to the worker in the target range image 60. In the example illustrated in FIG. 8, the display control unit 58 displays, as the determination result image 72 in the display device, a balloon image that balloons out from the worker mark 62. As a result, the display control unit 58 enables the administrator to easily confirm the job details of the worker.

Meanwhile, when a plurality of candidate types is determined, the display control unit 58 can display a candidate image 74, in which the candidate types are arranged in descending order of the degree of reliability, in the display device. As a result, the display control unit 58 enables the administrator to easily confirm the determination details of the determination device 30.

Figure 9:
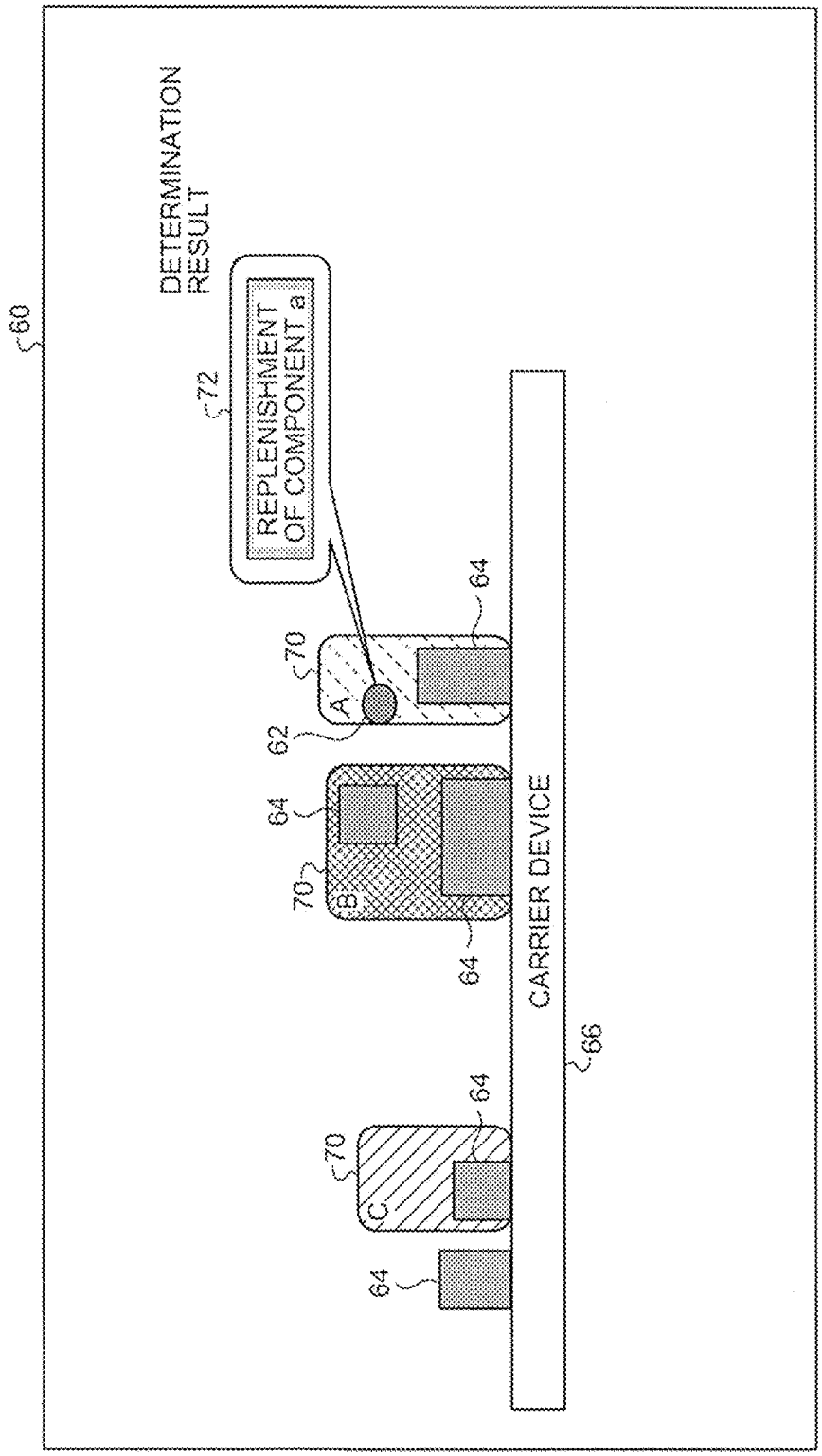
FIG. 9 is a diagram illustrating a second exemplary image displayed by the determination device according to the second embodiment.

FIG. 9 is a diagram illustrating a second exemplary image displayed by the determination device 30 according to the second embodiment. The display control unit 58 displays the target range image 60, the worker mark 62, the determination result image 72, and a plurality of partial area images 70 in the display device.

In this case, the display control unit 58 calculates, for each partial area 38, the total job time for which the worker did the job within a predetermined job period (for example, one day). Then, the display control unit 58 displays, in the display device, the partial area images 70 further indicating the calculated total job time.

For example, the display control unit 58 displays the partial area images 70 that undergo changes in color or concentration according to the duration of the total job time. For example, the longer the total job time in a particular partial area 38, the more concentrated is the color or the hatching of the corresponding partial area image 70 displayed by the display control unit 58.

Meanwhile, the display control unit 58 can calculate the mean position of the worker in any one partial area 38, and can display the worker mark 62 at the calculated mean position. Moreover, the display control unit 58 can display the determination result image 72 indicating the job type in any one partial area 38.

As a result, the display control unit 58 enables the administrator to confirm the result of statistical processing of the determination result. In this way, the determination device 30 according to the second embodiment can analyze the determination result from a plurality of perspectives, and then provide the determination result to the administrator.

Third Embodiment

Given below is the explanation of the determination device 30 according to a third embodiment. The determination device 30 according to the third embodiment has a substantially identical configuration and functions as the second embodiment. Hence, the same constituent elements are referred to by the same reference numerals, and the detailed explanation is given only about the differences from the second embodiment.

Figure 10:
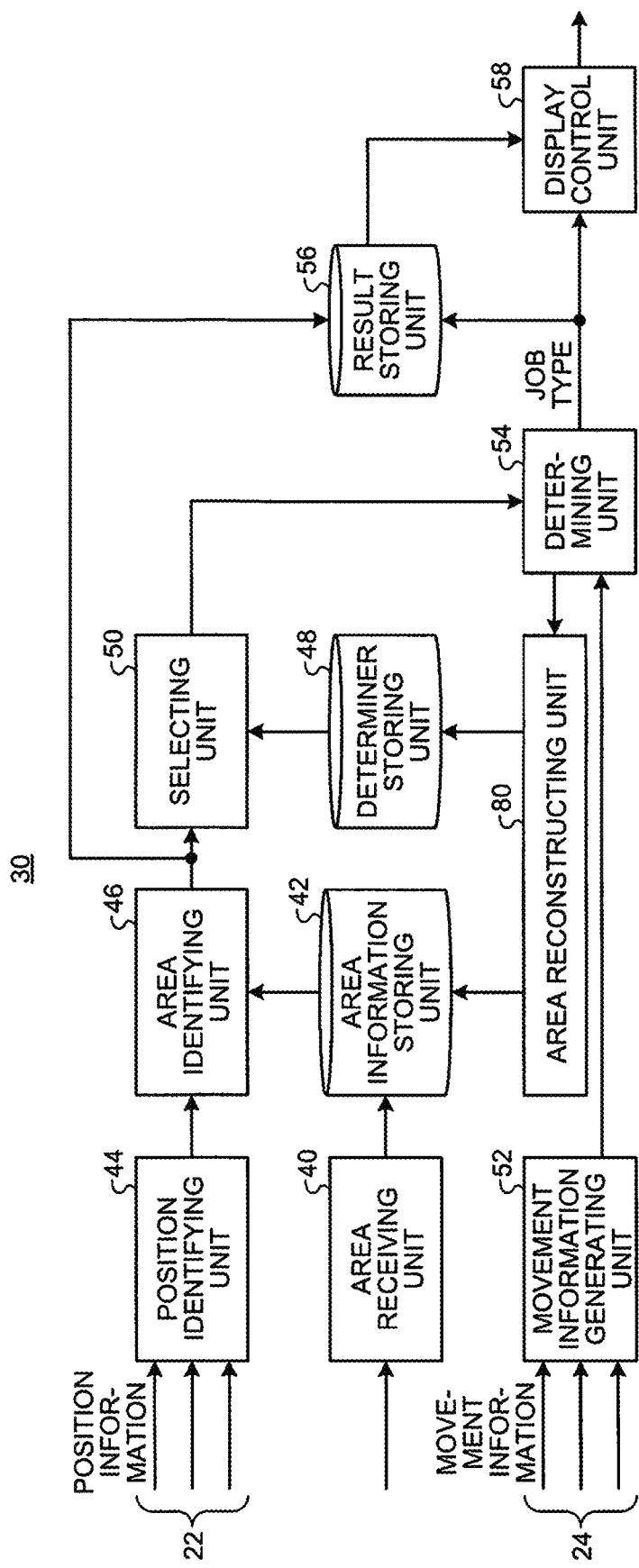
FIG. 10 is a diagram illustrating a configuration of the determination device according to a third embodiment.

FIG. 10 is a diagram illustrating a configuration of the determination device 30 according to the third embodiment. The determination device 30 according to the third embodiment further includes an area reconstructing unit 80.

The area reconstructing unit 80 maintains statistics of the job types in two neighboring partial area 38 within a predetermined job period (for example, one day or one week). Moreover, the area reconstructing unit 80 determines whether or not a ratio of coincidence between the job types in the two neighboring partial areas 38 is equal to or greater than a predetermined value within the predetermined job period. If the ratio of coincidence between the job types in the two neighboring partial areas 38 is equal to or greater than the predetermined value within the predetermined job period, then the area reconstructing unit 80 reconstructs a plurality of partial areas 38, which is stored in the area information storing unit 42, in such a way that the concerned two partial areas 38 are integrated into a single partial area 38. Moreover, after a plurality of partial areas 38 is reconstructed, the area reconstructing unit 80 also updates the corresponding relationship between the partial areas 38 and the determiners.

Figure 11:
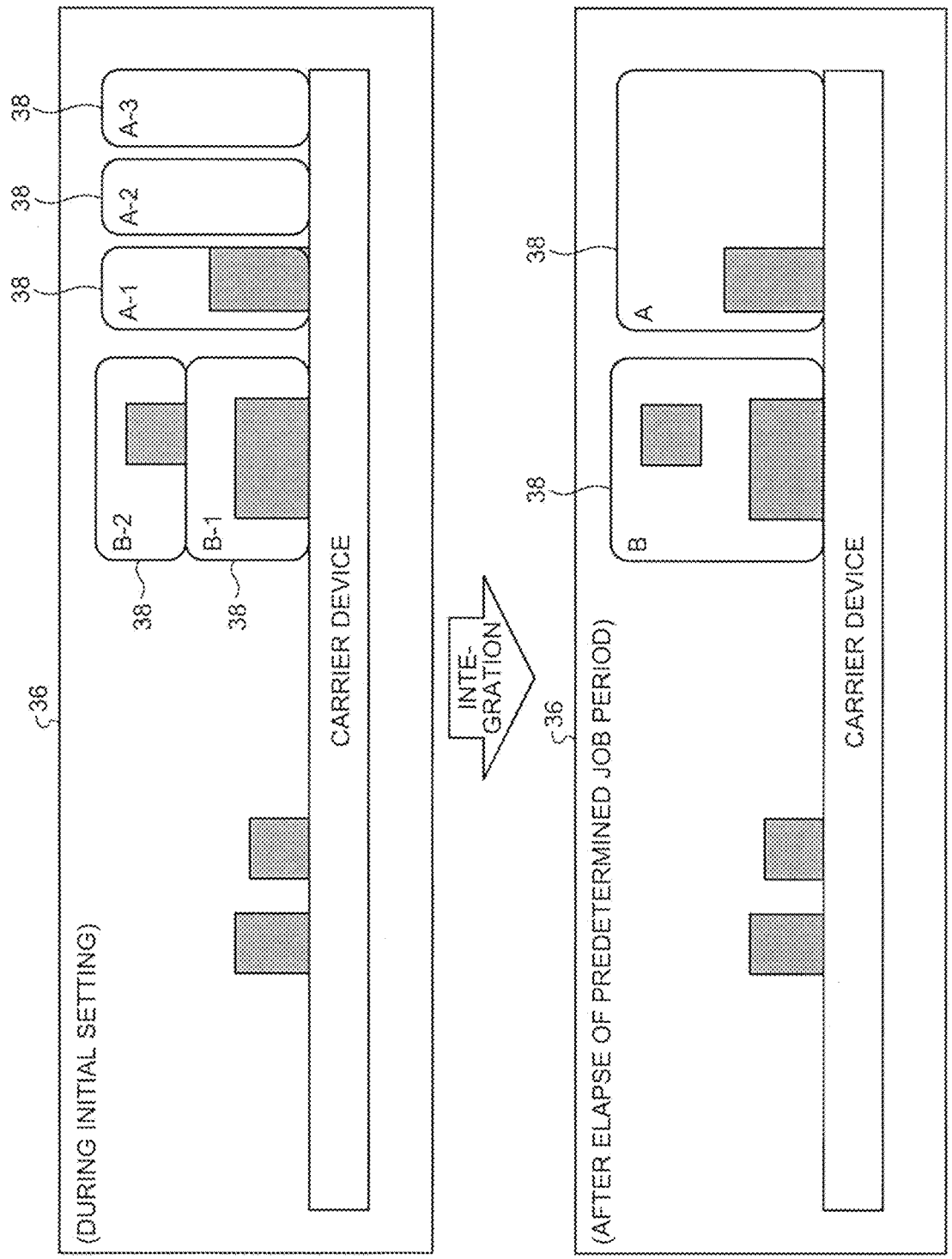
FIG. 11 is a diagram illustrating an example of integration of partial areas.

FIG. 11 is a diagram illustrating an example of integration of the partial areas 38. For example, as illustrated in the upper portion in FIG. 11, during the initial setting, assume that five partial areas 38, namely, A-1, A-2, A-3, B-1, and B-2 are set in the target range 36. For a predetermined job period since the initial setting, as a result of analyzing the job details of the worker, the job types in three neighboring partial areas 38 identified as A-1, A-2, and A-3 have the ratio of coincidence to be equal to or greater than a predetermined value. Moreover, the job types in two neighboring partial areas 38 identified as B-1 and B-2 have the ratio of coincidence to be equal to or greater than the predetermined value.

In that case, as illustrated in the lower portion in FIG. 11, the area reconstructing unit 80 integrates the partial areas 38 identified as A-1, A-2, and A-3, and generates a single partial area 38(A). Moreover, the area reconstructing unit 80 integrates the partial areas identified as B-1 and B-2, and generates a single partial area 38(B). Thus, by integrating a plurality of approximated partial areas 38, the determination device 30 can identify the job areas in an efficient manner.

Meanwhile, when a plurality of partial area images 70 representing a plurality of partial areas 38 is to be displayed in the display device, the display control unit 58 can integrate the partial areas 38 and then display them. More particularly, within a predetermined job period, when two neighboring partial areas 38 have the ratio of coincidence to be equal to or greater than a predetermined value, the display control unit 58 integrates the two partial areas 38 into a single partial area 38 and displays it. Thus, by integrating a plurality of approximated partial areas 38, the determination device 30 enables the administrator to confirm the job area in an easy-to-understand manner.

Fourth Embodiment

Given below is the explanation of the determination device 30 according to a fourth embodiment. The determination device 30 according to the fourth embodiment has a substantially identical configuration and functions as the second embodiment. Hence, the same constituent elements are referred to by the same reference numerals, and the detailed explanation is given only about the differences from the second embodiment.

Figure 12:
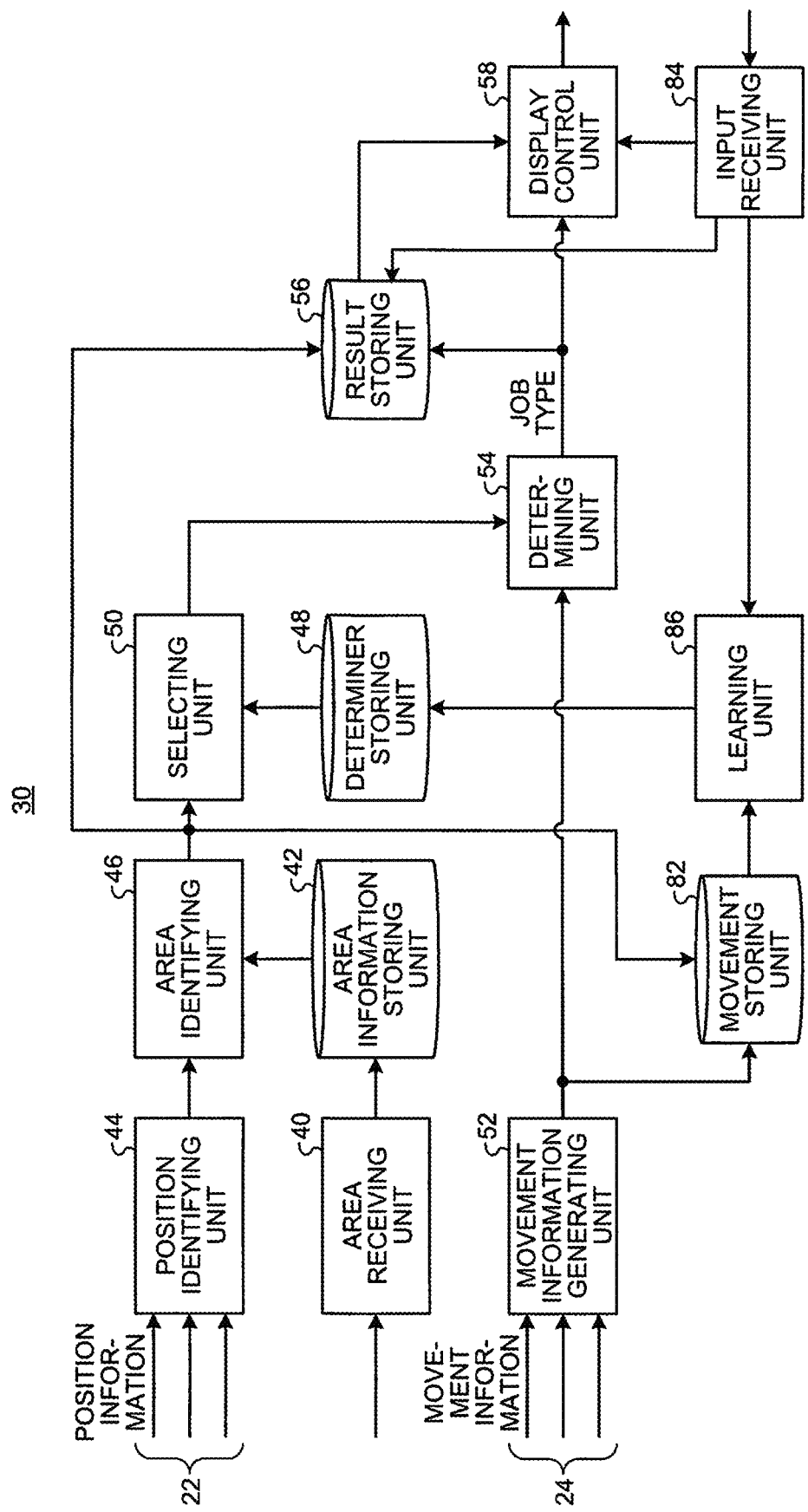
FIG. 12 is a diagram illustrating a configuration of the determination device according to a fourth embodiment.

FIG. 12 is a diagram illustrating a configuration of the determination device 30 according to the fourth embodiment. The determination device 30 according to the fourth embodiment further includes a movement storing unit 82, an input receiving unit 84, and a learning unit 86.

The movement storing unit 82 stores the worker movement information, which is generated by the movement information generating unit 52, in a corresponding manner to the job type, which is determined by the determining unit 54. Moreover, the movement storing unit 82 stores the job area, which is identified by the area identifying unit 46, in a corresponding manner to the job type.

Meanwhile, in case the presented job type is not correct, then the input receiving unit 84 receives the correct job type from the administrator. When the correct job type is received, the display control unit 58 displays the correct job type in the display device. Moreover, when the correct job type is received, the incorrect job type stored in the result storing unit 56 is replaced with the correct job type.

When the correct job type is received from the administrator, the learning unit 86 trains a plurality of determiners, which is stored in the determiner storing unit 48, based on the worker movement information stored in the movement storing unit 82 and based on the correct job type. In that case, the learning unit 86 need not train all determiners stored in the determiner storing unit 48, but can train the determiners associated with the identified job area. As a result, the learning unit 86 becomes able to train the determiners that made incorrect determination.

Figure 13:
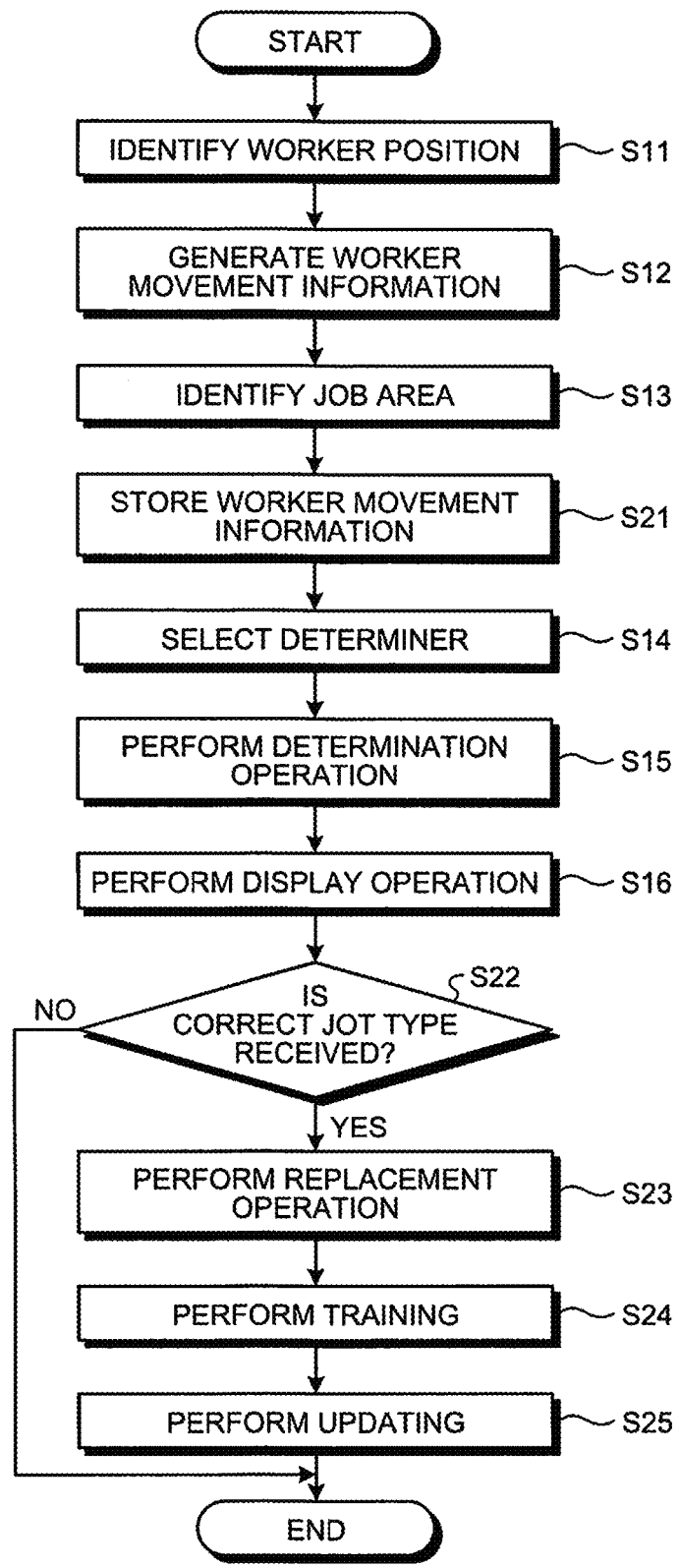
FIG. 13 is a flowchart for explaining the operations performed by the determination device according to the fourth embodiment.

FIG. 13 is a flowchart for explaining the operations performed by the determination device 30 according to the fourth embodiment. Thus, the determination device 30 according to the fourth embodiment performs operations according to the flow illustrated in FIG. 13.

The determination device 30 according to the fourth embodiment performs operations from S11 to step S13 in an identical manner to the operations performed according to the second embodiment as illustrated in FIG. 7. After the operation at step S13, the determination device 30 stores, at step S21, the generated worker movement information and the identified job area. After the operation at step S21, the determination device 30 performs operations from S14 to step S16 in an identical manner to the operations performed according to the second embodiment as illustrated in FIG. 7.

After the operation at step S16, the determination device 30 determines, at step S22, whether or not the correct job type is received from the administrator. If the correct job type is not received from the administrator, that is, if the determination result of the determination operation is correct (No at step S22), then the determination device 30 ends the flow of operations.

When the correct job type is received from the administrator, that is, when the determination result of the determination operation is not correct (Yes at step S22), the system control proceeds to step S23. Then, at step S23, the determination device 30 displays the correct job type in the display device, and replaces the incorrect job type with the correct job type in the result storing unit 56. Subsequently, at step S24, based on the worker movement information stored in the movement storing unit 82 and based on the correct job type, the determination device 30 trains the determiners associated with the identified job area. Then, at step S25, the determination device 30 updates the determiners based on the training result. After the operation at step S25, the determination device 30 ends the flow of operations.

Figure 14:
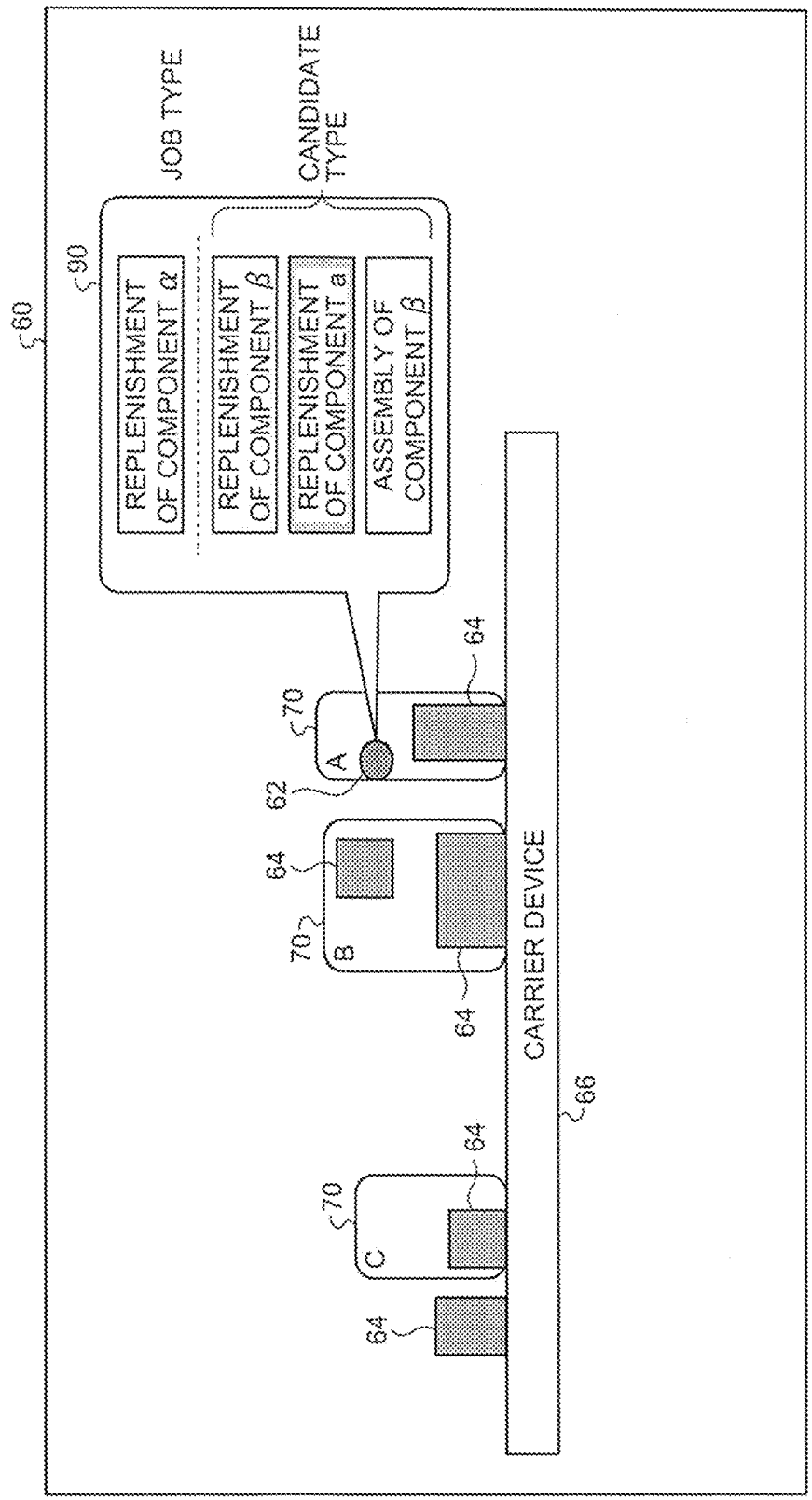
FIG. 14 is a diagram illustrating an exemplary image displayed by the determination device according to the fourth embodiment.

FIG. 14 is a diagram illustrating an exemplary image displayed by the determination device 30 according to the fourth embodiment. The display control unit 58 according to the fourth embodiment displays the target range image 60, the worker mark 62, and a plurality of partial area images 70 in the display device.

Moreover, the display control unit 58 displays, in the display device, a type image 90 that includes the determined job type and at least one candidate type representing a candidate for the job type. If the job type included in the type image 90 is not correct, then the administrator selects one of the candidate types as the correct job type.

When the correct job type is selected, the display control unit 58 displays the correct job type in the display device. Moreover, the result storing unit 56 stores therein the correct job type in place of the incorrect job type. Furthermore, the learning unit 86 trains the determiners based on the correct job type. In this way, in the determination device 30 according to the fourth embodiment, the determination result can be properly corrected and the learning of the determiners can be properly carried out.

Hardware Configuration

Figure 15:
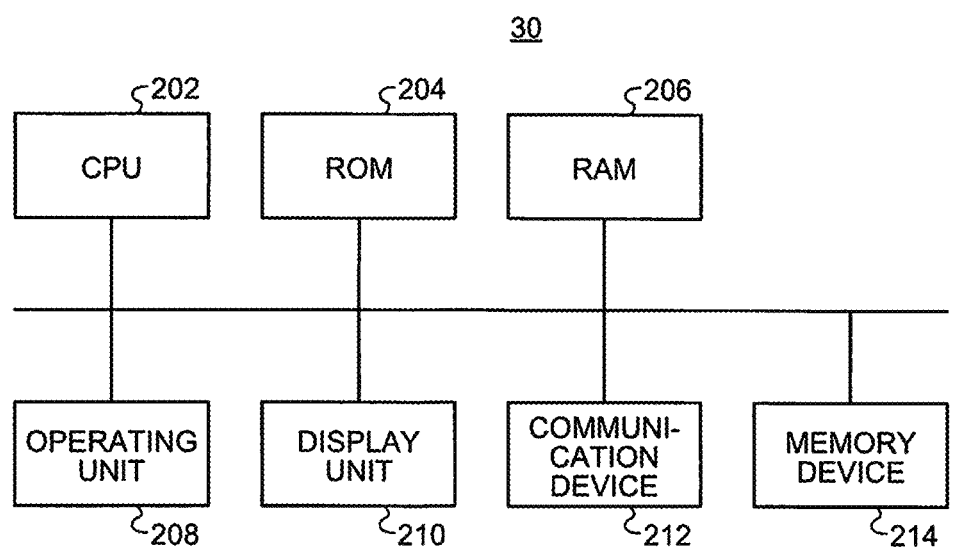
FIG. 15 is a diagram illustrating a hardware configuration of the determination device.

FIG. 15 is a diagram illustrating a hardware configuration of the determination device 30. As an example, the determination device 30 can have the hardware configuration of a commonly-used computer (information processing device). The determination device 30 can be run by executing predetermined computer programs.

The determination device 30 includes a central processing unit (CPU) 202, a read only memory (ROM) 204, a random access memory (RAM) 206, an operating unit 208, a display unit 210, a communication device 212, and a memory device 214. Those constituent elements are connected to each other by a bus.

The CPU 202 is a processor for performing information processing; loads computer programs from the memory device 214 into the RAM 206 and executes them; performs input-output by controlling the constituent elements; and processes data. The CPU 202 can be configured using one or more processors. Moreover, as long as computer programs can be executed, the determination device 30 need not include the CPU 202 and can include some other processor. The ROM 204 stores a start program that reads a boot program from the memory device 214 into the RAM 206. The RAM 206 functions as the work area for the CPU 202 and stores data.

The operating unit 208 is an input device such as a mouse or a keyboard that receives, as an instruction signal, information input by the user and outputs the instruction signal to the CPU 202. The display unit 210 is a display device such as a liquid crystal display (LCD). The display unit 210 displays a variety of information based on display signals received from the CPU 202. The communication device 212 communicates information with external devices via a network. The memory device 214 is, for example, a hard disk drive or a flash memory. The memory device 214 stores the computer program executed by the determination device 30, and stores an operating system.

The computer program executed by the determination device 30 according to the embodiments is recorded as an installable file or an executable file in a computer-readable recording medium such as a compact disc read only memory (CD-ROM), a flexible disk (FD), a compact disc recordable (CD-R), or a digital versatile disc (DVD). Alternatively, the computer program executed by the determination device 30 according to the embodiments can be stored in a downloadable manner in a network such as the Internet. Still alternatively, the computer program executed by the determination device 30 according to the embodiments can be distributed via a network such as the Internet. Still alternatively, the computer program executed by the determination device 30 according to the embodiments can be stored in advance in the ROM 204.

The computer program that makes an information processing device function as the determination device 30 contains an area reception module, a position identification module, an area identification module, a selection module, a movement information generation module, and a determination module. In the determination device 30, the processor (the CPU 202) reads the computer program from the memory medium (the memory device 214) and executes it so that the modules get loaded in a main memory device (the RAM 206), and the processor (the CPU 202) functions as the area receiving unit 40, the position identifying unit 44, the area identifying unit 46, the selecting unit 50, the movement information generating unit 52, and the determining unit 54. Meanwhile, some or all of the constituent elements can alternatively be implemented using hardware other than a processor. The memory device 214 functions as the area information storing unit 42 and the determiner storing unit 48. Alternatively, the area information storing unit 42 and the determiner storing unit 48 can be implemented using an external server outside the determination device 30. In that case, the determination device 30 accesses the area information storing unit 42 and the determiner storing unit 48 via the communication device 212.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A determination device comprising
one or more processors configured to:
identify a worker position;
identify a job area which includes the worker position;
from among a plurality of determiners meant for determining job details of persons from movement information indicating movements of persons, select at least one determiner associated with the job area;
generate worker movement information indicating movements of a worker;
train the plurality of determiners based on the worker movement information and the job area; and
use the at least one selected determiner and determine a job type indicating job details of the worker based on the worker movement information.

2. The determination device according to claim 1, wherein in identifying of the job area, the processors identify, as the job area, a single partial area which, from among a plurality of partial areas set in advance, includes the worker position.

3. The determination device according to claim 2, further comprising a result storing unit that stores the job type determined at regular intervals and the job area identified at the regular intervals in a corresponding manner to timing of movement of the worker.

4. The determination device according to claim 3, wherein the processors are further configured to:
display, in a display device, a target range image indicating a target range for determining job details of the worker and a plurality of partial area images indicating the plurality of partial areas in the target range, wherein
for each of the plurality of partial areas, the processors calculate a job time for which the worker performed job within a predetermined job period, and display the plurality of partial area images further indicating the calculated job time.

5. The determination device according to claim 3, wherein the processors are further configured to:
display, in a display device, a target range image indicating a target range for determining job details of the worker and a plurality of partial area images indicating the plurality of partial areas in the target range, wherein
when a ratio of coincidence of the job type in two neighboring partial areas is equal to or greater than a predetermined value within a predetermined job period, the processors display a single partial area formed by integrating the two neighboring partial areas.

6. The determination device according to claim 2, wherein the processors are further configured to:
when a ratio of coincidence of the job type in two neighboring partial areas is equal to or greater than a predetermined value within a predetermined job period, reconstruct the plurality of partial areas in such a way that the two neighboring partial areas are integrated into a single partial area.

7. The determination device according to claim 1, wherein in determining of the job type, the processors
calculate a plurality of candidate types representing candidates for job type of the worker,
calculate a degree of reliability of each of the plurality of candidate types, and
output a candidate type having a highest degree of reliability as the job type.

8. The determination device according to claim 7, wherein the processors are further configured to:
display, in a display device, a candidate image in which the plurality of candidates is arranged in descending order of the degree of reliability.

9. The determination device according to claim 1, wherein, at regular intervals, the processors
identify the worker position,
identify the job area,
select the at least one determiner,
generate the worker movement information, and
determine the job type.

10. The determination device according to claim 1, wherein
the processors are further configured to:
display, in a display device,
a target range image indicating a target range for determining job details of the worker,
a worker mark indicating the worker position in the target range, and
a determination result image indicating the determined job type.

11. The determination device according to claim 1, further comprising:
a movement storing unit that stores the generated worker movement information in association with the determined job type.

12. The determination device according to claim 11, wherein
the movement storing unit further stores the identified job area in association with the job type, and
in training, the processors train at least one determiner associated with the job area.

13. The determination device according to claim 12, wherein
the processors are further configured to:
present, to a user, the determined job type and a plurality of candidate types representing candidates for job type of the worker; and
receive a selection of one candidate type from among the plurality of candidate types, wherein
when the selection of a candidate type different from the job type presented to the user by the input receiving unit is received, in determining of the job type, the processors output the selected candidate type as new job type, and
when the selection of a candidate type different from the presented job type is received, in learning, the processors use the new job type and train the determiner used in determination.

14. The determination device according to claim 1, wherein the one or more processors are further configured to update the plurality of determiners based on a result of training.

15. The determination device according to claim 1, wherein the one or more processors are further configured to display, in a display device, a target range image comprising:
a determination result image;
a plurality of partial area images; and
a carrier device image.

16. The determination device according to claim 15, wherein the target range image further comprises:
a worker mark;
manufacturing device images; and
a type image.

17. The determination device according to claim 15, wherein the plurality of partial area images comprise one or more integrated partial areas that merge two or more neighboring partial areas based on a job type coincidence ratio.

18. A determination method implemented for determining job type, which indicates job details of a worker, using an information processing device, the determination method comprising:
identifying a worker position;
identifying, by the information processing device, a job area which includes the worker position;
selecting, from among a plurality of determiners meant for determining job details of persons from movement information indicating movements of persons, at least one determiner associated with the job area;
generating worker movement information indicating movements of a worker;
training the plurality of determiners based on the worker movement information and the job area; and
using the at least one selected determiner and determining job type indicating job details of the worker based on the worker movement information.

19. A computer program product comprising a non-transitory computer-readable medium containing a program executed by a computer, the program causing the computer to execute:
identifying a worker position;
identifying, by the information processing device, a job area which includes the worker position;
selecting, from among a plurality of determiners meant for determining job details of persons from movement information indicating movements of persons, at least one determiner associated with the job area;
generating worker movement information indicating movements of a worker;
training the plurality of determiners based on the worker movement information and the job area; and
using the at least one selected determiner and determining job type indicating job details of the worker based on the worker movement information.

20. The determination device according to claim 19, wherein training the plurality of determiners comprises training the plurality of determiners based on movement information stored in a movement storing unit and a correct job type associated with the job area.

* * * * *